United States Patent [19]
Aanonsen et al.

[11] Patent Number: 5,755,266
[45] Date of Patent: May 26, 1998

[54] LAMINATED PIPE FOR OFFSHORE OIL PRODUCTION, INCLUDING SEQUENTIAL LAYERS OF REINFORCING FIBERS AND FIBER MAT IN CURED MATRIX OF PLASTIC RESIN, ON THERMOPLASTIC LINER TUBE

[75] Inventors: Torbjørn Atle Aanonsen, Oslo; Jørgen Espedalen, Tau, both of Norway

[73] Assignee: Compipe A/S, Stavanger, Norway

[21] Appl. No.: 611,975

[22] Filed: Mar. 6, 1996

Related U.S. Application Data

[63] Continuation of Ser. No. 150,133, filed as PCT/NO92/00097, May 27, 1992, published as WO92/21908, Dec. 10, 1992.

[30] Foreign Application Priority Data

May 31, 1991 [NO] Norway ................................. 912103

[51] Int. Cl.$^6$ .................................................. F16L 11/04
[52] U.S. Cl. ......................... 138/174; 138/130; 138/125; 138/140
[58] Field of Search ........................... 138/125, 130, 138/140, 172, 174

[56] References Cited

U.S. PATENT DOCUMENTS

| | | | |
|---|---|---|---|
| 1,358,633 | 11/1920 | Hachmann . | |
| 2,467,999 | 4/1949 | Stephens | 138/174 |
| 2,747,616 | 5/1956 | De Ganahl | 138/130 |
| 2,825,364 | 3/1958 | Cullen et al. | 138/130 |
| 3,002,534 | 10/1961 | Noland | 138/174 |
| 4,336,415 | 6/1982 | Walling | 138/125 |
| 4,898,212 | 2/1990 | Searfoss et al. | 138/125 |

FOREIGN PATENT DOCUMENTS

| | | |
|---|---|---|
| 1229938 | 4/1971 | United Kingdom . |
| 1485688 | 9/1977 | United Kingdom . |
| 2077880 | 12/1981 | United Kingdom . |
| 2178820 | 2/1987 | United Kingdom . |

*Primary Examiner*—Patrick Brinson
*Attorney, Agent, or Firm*—Cushman Darby & Cushman IP Group of Pillsbury Madison & Sutro LLP

[57] ABSTRACT

A laminated pipe for oil production offshore includes a thermoplastic inner pipe coated with a laminate of matrix material having one or more layers of reinforcing fibres. A method for production of the laminated pipe and a connection device for joining the pipes are also disclosed.

4 Claims, 4 Drawing Sheets

LAMINATED PIPE FOR OFFSHORE OIL PRODUCTION, INCLUDING SEQUENTIAL LAYERS OF REINFORCING FIBERS AND FIBER MAT IN CURED MATRIX OF PLASTIC RESIN, ON THERMOPLASTIC LINER TUBE

This is a continuation of application Ser. No. 08/150,133, filed as PCT/NO92/00097, May 27, 1992, published as WO92/21908, Dec. 10, 1992, which was abandoned upon the filing hereof.

BACKGROUND OF THE INVENTION

The present invention is related to a method for making a laminated pipe and to a laminated pipe produced by this method, and more specifically to a laminated pipe for injection of chemicals into an underwater drilled well connected between a host oil platform and an underwater satellite station. The laminated pipe can also be used for hydraulic regulation of valves in satellite stations. The laminated pipe can be operated with high pressures; it is resistant against chemicals, and can be spooled onto a drum.

A production platform surrounded by several oilwells at a distance from the production platform is often used during oil production offshore. During the past few years a special method for oil production from deep-sea oilwells has been developed, where each well has an underwater satellite station with the required production facilities, such as valves. These satellites are connected by piping to the host platform, where the controlling and production of the oilwells are conducted.

When well drilling and oil production offshore, it is necessary to inject chemicals to underwater installations and supply hydraulic fluids to valves, etc., especially with hydraulic regulation of the wellhead Christmas tree. When a valve in the underwater installation is to be opened or closed, these actions must be performed during the shortest possible time for instance when blow outs occur.

If a blowout occurs at the wellhead, it will often take several minutes for the hydraulic signals to reach the wellhead, because of long reponse time. This response time is a result of the fibres in the signal pipe being woven without matrix material outside the thermoplastic pipe. A result of this, is that the stretch volume increases and thereby the response time will increase. The environmental consequence of the fact that it can take up to several minutes to close-down a blowout under water can be very severe.

Known pipes as described above are mainly steel pipes of different types and thermoplastic pipes with an outer load-bearing wound sheet of polymer fibres.

These prior art pipes have several disadvantages. The steel pipes will corrode and the reinforced thermoplastic pipes have a too long response time when hydraulic signals are transmitted over long distances. The transported chemicals will also have a tendency to diffuse through the plastic material. Another disadvantage with the prior art pipes is that they are not spoolable, i.e. they must be installed in sections, and consequently the sections need to be joined. This will result in increased costs due to the required arrangements with pipe joining at large sea depths. Another disadvantage with prior art laminated pipes with an inner pipe of thermoplastic and an outer composite sheet of a reinforced thermoset resin, is that the mechanical strength between the thermoplastic and the thermoset resin is insufficient. The reason for this is the difficult grafting of a thermoplastic to a thermoset resin.

SUMMARY OF THE INVENTION

One object according to the present invention is to provide a laminated pipe with significant lower response time than prior pipes, which pipes can be produced in infinite lengths. A result of this is that it is not required to join the pipes at other positions than at the connections between the pipe and the connection sites. In addition these laminated pipes will be more resistant towards chemicals than corresponding steel pipes.

Another object is to provide a laminated pipe that can be spooled (i.e., spirally wound or coiled) onto a drum and installed by a conventional cable-laying vessel by being unwound or uncoiled from the drum.

Another object is to provide a method for production of a laminated pipe described above which method results in grafting between the thermoplastic and the thermoset resin.

Another object is to provide a connection device for the laminated pipes.

These objects are achieved according to the invention with a laminated pipe that is characterized in that it comprises a thermoplastic inner pipe coated with a fibre reinforced thermoset resin and one or more layers of reinforcing fibres, which reinforcing fibres are chosen from glass fibre, carbon fibre and polymer fibres or combinations thereof. The laminated pipe according to the invention can comprise an inner thermoplastic liner coated with a layer of longitudinal reinforcing fibres, a layer of circumferentially extending radial reinforcing fibres, a multidirectional reinforcing mat, longitudinal reinforcing fibres and circumferentially extending radial reinforcing fibres, where all the layers are joined with thermoset resin, preferably epoxy. The laminated pipes are also characterized in that they are spoolable on a drum with a diameter dependent on the pipes' outer diameter and the thickness of the laminate. The aforementioned pipe can be manufactured to contain a liquid in accordance with the method of the present invention.

The present invention also relates to a method for producing a laminated pipe characterized in that a thermoplastic liner acts as a carrier for the subsequent layers. The thermoplastic liner is produced in an extruder and is subjected to a longitudinal stretch that extends the pipe in its longitudinal direction, by an amount corresponding to the pipe's thermal expansion at cure temperature, prior to application of the laminates. Prior to application of the laminates, the thermoplastic liner is subjected to a suitable degreasing composition such as acetone, rubbing with a suitable abrasive, such as abrasive paper, and washing with a suitable degreasing composition to ensure that during the lamination process there will be obtained chemical and mechanical bonds between the thermoplastic liner and the thermoset resin. The laminate pipe is produced in any particular lengths, with continuous winding of the reinforcing fibres without winding these. Alternatively this pretreatment can comprise application of a ter-polymer by means of a crosshead extruder, to obtain a chemical bond between the thermoplastic and the thermoset resin. The laminate pipe is produced in indeterminate lengths, with continuous application of reinforcing fibres without winding these.

The present invention also concerns a connection device for a laminated pipe, characterized in that it comprises a steel pipe with an inner cone, with a slotted section at the cone's largest diameter, a pipe adapter with a cone, The smallest diameter of which corresponds to the thermoplastic liner's inner diameter.

DESCRIPTION OF A PRESENTLY PREFERRED EMBODIMENT

Figure 1:
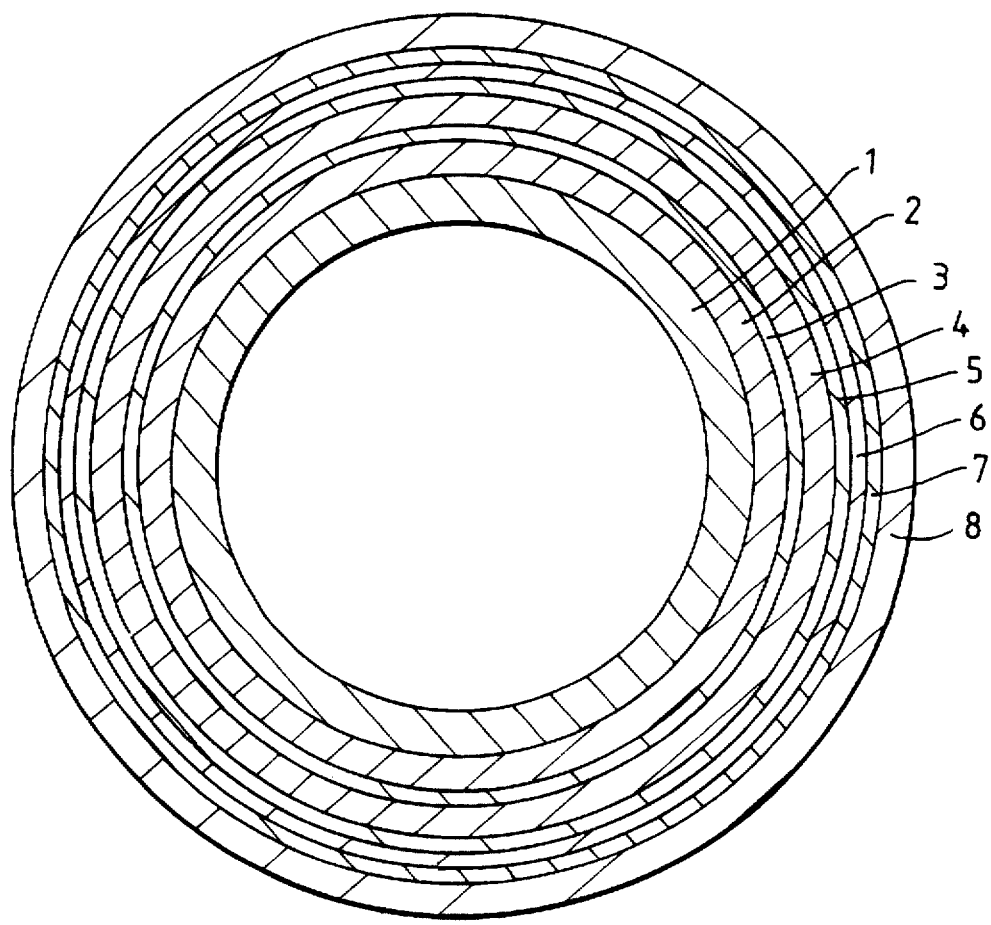
FIG. 1 is a sectional view of a laminated pipe according to the invention.

FIG. 1 is a sectional view of a laminated pipe according to the invention. In the drawing, the layers are shown with equal thickness, but this is for illustrative purposes only. The laminated pipe according to FIG. 1 comprises an inner thermoplastic liner 1, with a layer of longitudinal glass fibres 2, a multidirectional mat 3, a circumferentially extending layer of glass fibres 4, a multidirectional mat 5, a longitudinal layer of glass fibres 6, a multidirectional mat 7 and a circumferentially extending layer of glass fibres 8. All these layers are bonded together with a thermoset resin. As shown in FIG. 1, each of the layers 2–8 successively applied on the liner 1 throughout the axial extent of the liner 1, is circumferentially continuous about the longitudinal axis of the liner 1.

Figure 2:
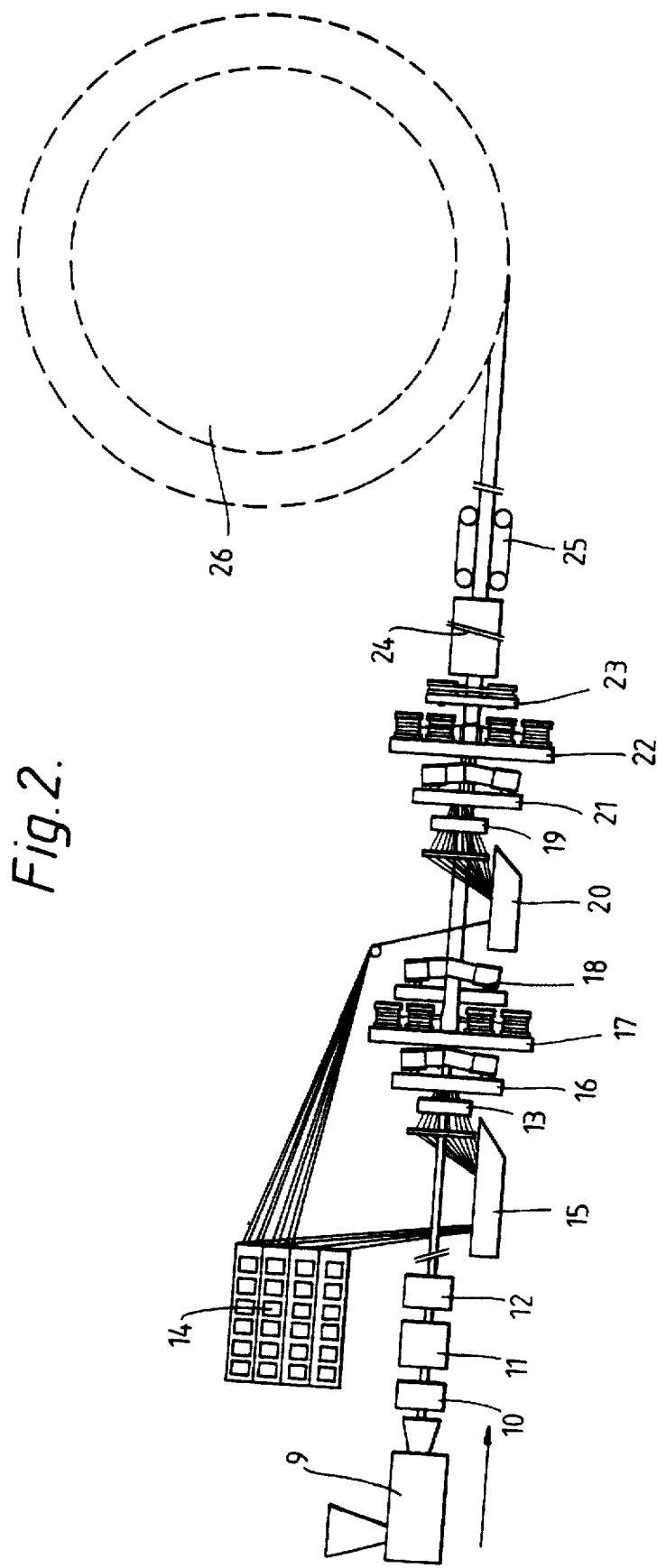
FIG. 2 is a flow sheet of a process for producing a laminated pipe according to the invention.

FIG. 2 illustrates a method for producing a laminated pipe according to the invention. The thermoplastic liner is extruded 9 and given a longitudinal stretch. This longitudinal stretch, that extends the pipe, corresponds to the thermoplastic pipes thermal expansion in its longitudinal direction, at curing temperature. The thermoplastic liner achieves frozen-in tensions in its longitudinal direction. These thermal tensions will later be released during curing, with a positive effect on the binding conditions between the thermoset resin and the thermoplastic. Subsequent to extrusion the thermoplastic liner will be stored or fed through a buffer station (not shown) to the production process.

Immediately prior to the laminating process, the thermoplastic liner is subjected to a pre-treatment 10 consisting of washing the liner with a suitable degreasing composition, such as acetone, and subsequent rubbing 11 of the outer part of the liner with a rotating abrasive paper, such as a grade 40 abrasive paper. The liner is washed/rinsed at 12, e.g. with acetone, and fed to the production process. The thermoplastic liner does not come in contact with fat or contaminating materials during the abrasion/washing-process. This pre-treatment of the thermoplastic liner is shown at 10–12 in FIG. 2. An alternative to this pretreatment, is application of a ter-polymer on the outer surface of the liner. The ter-polymer is applied with a crosshead extruder (not shown) and results in chemical bonding between thermoplastic thermoset resin.

The thermoplastic liner is now ready for laminate application, which laminates are applied at room temperature. The laminates are directly applied to the thermoplastic liner support and this eliminates the need for an interior mandrel that is used in the course of conventional production of laminated pipes. Laminated pipes are usually produced by laminating/wrapping fibres onto a rotating mandrel. In practicing the process according to the invention neither the thermoplastic liner nor the laminate rotates. At first, one layer of fibres is applied directly onto the thermoplastic liner in the longitudinal direction, at 13. The glass fibres are fed from a magazine 14 with, using so-called callipers, and subsequently through a bath 15 containing thermoset resin, where the fibres are impregnated. The glass fibre are placed in a side-by-side relation and cover the thermoplastic liner completely. Next, a layer of multidirectional mat 16 is applied. Outside this mat 16 another layer of circumferentially extending glass fibre is applied by means of a carrousel 17. Outside this layer, another multidirectional mat 18, impregnated with thermoset resin, is applied. This mat 18 is a thin, felt-like glass fibre mat.

A layer of longitudinal glass fibres 19, impregnated with thermoset resin in a bath 20, is applied onto the mat 18.

Outside this axial layer 19, a multidirectional mat 21 is applied. Subsequently, a final layer of circumferentially extending glass fibres is applied by means of a rotating carrousel 22.

Finally two layers of cellophane tape 23 are wrapped over the laminate, in order to prevent loss of thermoset resin and prevent oozing of laminate during the subsequent curing process.

The laminate pipe is fed into a curing oven where the epoxy is cured. The curing oven is a pipe that is externally insulated with mineral wool. Inside the oven, there is mounted a V-shaped rail on which the laminated pipe is pulled by means of a belt-conveyer 25. The curing oven 24 has a fan and an heating element with a controller.

The length of the curing oven is determined according to curing time and production velocity. The laminated pipe is to be cured by the time it leaves the oven 24.

When the pipe has left the oven 24, the cellophane tapes are washed away. The pipe is cooled, and when it has reached ambient temperature, spooled onto a drum 26. Due to the fact that the pipe has flexibility, the drum 26 is motor driven.

A pulling wire is placed between the belts in the belt-conveyer and pulls the longitudinal fibres and the thermoplastic liner through the production process and into the curing oven 24. When the forward end of the pipe leaves the curing oven 24, the distance between the rubber belts is increased and the conveyer 25 pulls the pipe itself.

The production of the laminated pipe is based on a continuous process. In principle, the laminated pipe can be produced in infinite lengths, and it is possible to connect the pipes by known techniques if necessary. If a rupture should occur, the pipe can be connected, using a steel connection, after the pipe is cured.

The thermoplastic pipe and the external loadbearing laminate achieve a mechanical and chemical binding through the production process. This binding will prevent separation of the thermoplastic liner and the laminate when the pipe is in operation. The mechanical binding between the thermoplastic liner and the laminate is achieved by the mechanical rubbing and surface rinsing with a degreasing composition prior to lamination and a chemical binding (grafting) between the thermoplastic liner and the curing substance in the thermoset resin. The heat produced in the curing oven will after some time be transferred from the laminate to the thermoplastic liner. Due to the curing temperature, the thermal tensions in the liner will be released and the liner will contract in the longitudinal direction in a ratio corresponding to the extension of the pipe if it had not been subjected to tension during extrusion. The real extension of the thermoplastic liner in the longitudinal direction is approximately zero. When the curable material starts to cure, the thermoplastic liner is stabilized and the thermoset resin will form mechanical and chemical bonds to the surface of the thermoplastic liner. When the laminated pipe leaves the curing oven, the temperature will decrease and the thermoset resin and the liner will contract. The thermal treatment reduces the frozen-in tensions in the thermoplastic liner. The result of the applied axial tension to the thermoplastic liner is that the liner will have a minor plastic deformation when the curing process is complete and the temperature has decreased to ambient temperature. This will give a better binding between the thermoplastic and the thermoset resin and the permanent shear stress will be minimized. Thereby, the shear stress between thermoset resin and thermoplastic will decrease.

The laminated pipe is subjected to a number of different stresses and loads during production, transport, installation and operation. The composition of the composite laminate is based on the physical and environmental conditions that occur during production and the pipe's lifetime.

Based on the presumed loads, the laminated pipes are subjected to, the composition of the pipes can, of course, differ from the embodiments depicted in FIGS. 1 and 2. The number of layers and their directions can be varied.

Figure 3:
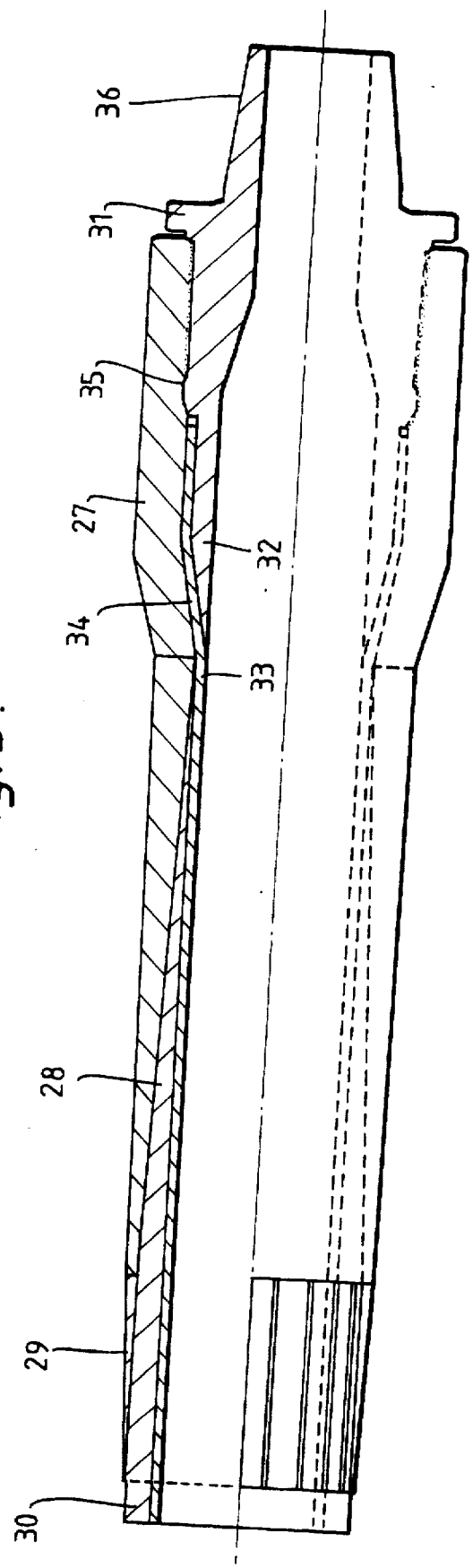
FIG. 3 is a sectional view of a connection device according to the invention.

FIG. 3 shows a connection device comprising a steel pipe 27 with an inner conical surface 28 that is attached to a corresponding external conical surface 28 on the composite pipe. The steel pipe 27 has a slotted section 29 at the largest diameter of the interface of the conical surfaces 28, which section reduces the tensions at the intermediate section between the composite pipe 30 and the steel pipe 27 during operation. In the other end of the steel pipe, a pipe adapter 31 with a cone 32, the least diameter of which corresponds to the inner diameter of the thermoplastic liner, is pushed into the thermoplastic liner 33. This cone will force the thermoplastic liner outwards and it will be attached to the inner surface 34 of the steel pipe simultaneously, like the laminated pipe. The pipe adapter 31 will replace the function of the thermoplastic pipe, and, in addition, the adhesive and the laminate will not be exposed to the transported fluid. The pipe adapter 31 is connected to the inner surface of the steel pipe, which is threaded, where two conical surfaces abut and form a primary contact surface. The connection device can connect the laminated pipe to any other piping by suitable design of the other end of the pipe adapter. The adhesive can be a sand-containing thermoset resin.

Figure 4:
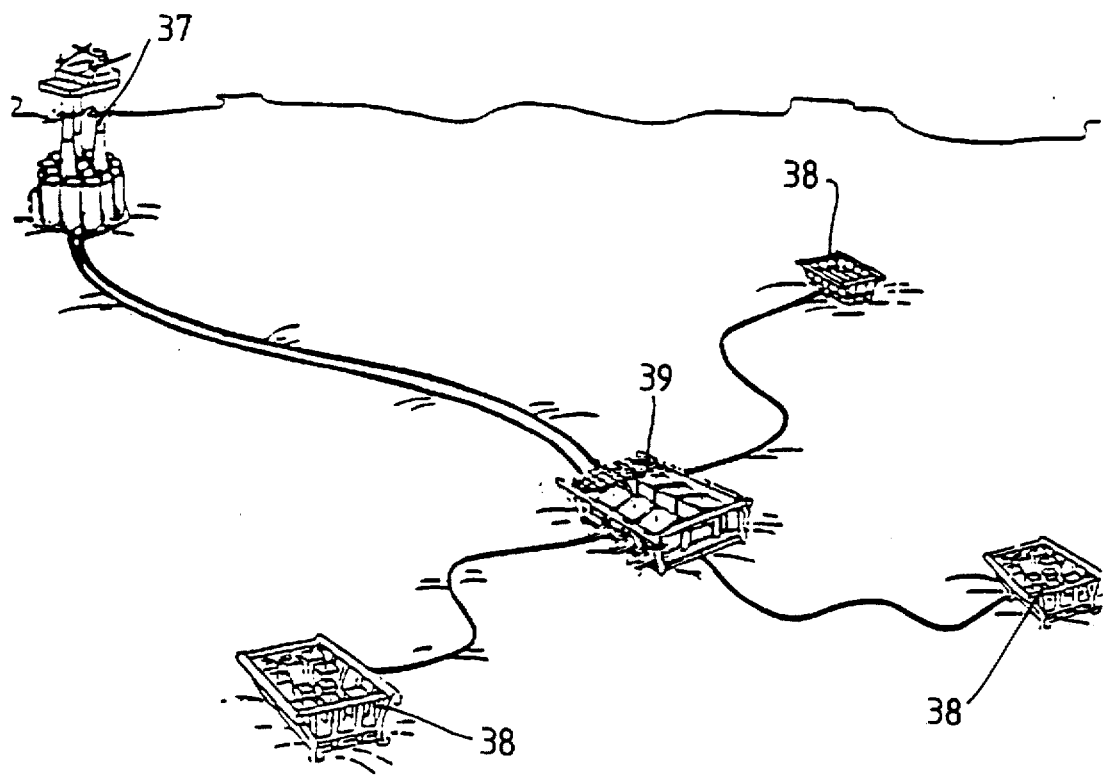
FIG. 4 is an example of a use of a laminated pipe according to the invention.

FIG. 4 illustrates an example of operation of a laminated pipe according to the invention, between a host platform 37 and underwater installations, such as satellites 38, 39.

After production, the laminated pipe is spooled onto a drum and transported by a conventional laying vessel (cable-laying vessel) to the installation site, connected to an oil-producing platform and laid along a predetermined route. If necessary, the pipe can be dug into the sea bed during laying. The other end of the laminated pipe is connected to a predetermined underwater installation (e.g.) a sub-sea template).

Sections of laminated pipes can be joined using metallic connections wherever necessary during installation. The metallic connections are adhered to the laminated pipe.

The laminated pipe can transport chemicals and/or water for injection into a transport for oil through a Christmas tree. The chemicals will follow the oil flow in the flow line back to the host platform while water is injected into the well to enhance the oil recovery. The laminated pipe can also transport oil/fuel as a flow line.

The laminated pipe can also be used for hydraulic regulation of valves in satellite stations. When well drilling and producing oil, especially with hydraulic regulation of a valve, for causing the valve to be opened or closed, liquid carried in the laminated pipe can serve as means for transporting the hydraulic signals for causing the valve to open and close.

The laminated pipe also has many applications on-shore. The pipe can be installed, without digging, in areas where there are low risks for physical damage or environmental influence. The pipe can, if necessary, be insulated with a fire-proof coating in areas which have a fire hazard.

In on-shore oil producing wells, the laminated pipe can be used for injection of water and transport of crude oil from the well to a storage site.

I claim:

1. A laminated pipe for offshore oil production, comprising:

a thermoplastic liner tube, having a longitudinal axis along an axial extent, a circumference, an external peripheral surface, and an internal peripheral surface;

a first layer of longitudinal reinforcing fibers distributed completely about the circumference of said liner tube, and laid on said external peripheral surface throughout said axial extent;

a first layer of multidirectional fiber mat distributed completely about the circumference of said liner tube, and laid on said first layer of longitudinal reinforcing fibers throughout said axial extent;

a first layer of circumferential reinforcing fibers distributed completely about the circumference of said liner tube, and laid on said first layer of multidirectional fiber mat throughout said axial extent;

a second layer of multidirectional fiber mat distributed completely about the circumference of said liner tube, and laid on said first layer of circumferential reinforcing fibers throughout said axial extent;

a second layer of longitudinal reinforcing fibers distributed completely about the circumference of said liner tube, and laid on said second layer of multidirectional fiber mat throughout said axial extent;

a third layer of multidirectional fiber mat distributed completely about the circumference of said liner tube, and laid on said second layer of longitudinal reinforcing fibers throughout said axial extent;

a second layer of circumferential reinforcing fibers distributed completely about the circumference of said line tube, and laid on said third layer of multidirectional fibers;

each said fiber layer being made of at least one material selected from the group consisting of glass, carbon and polymeric plastic material; and a matrix of cured plastic resin material coated on said external peripheral surface of said liner tube and on each of said fiber layers and connecting said fiber layers serially to one another and to said external peripheral surface of said tube.

2. The laminated pipe of claim 1, wherein:

each of said layers extend throughout said axial extend; and further including a spool;

said pipe being spirally wound onto said spool.

3. A method for containing a liquid, comprising the steps of:

(a) providing a thermoplastic tube;

(b) thereafter externally coating said tube with a first layer of longitudinal reinforcing fibers;

(c) thereafter externally coating said first layer of longitudinal reinforcing fibers with a first multidirectional reinforcing mat;

(d) thereafter externally coating said first multidirectional reinforcing mat with a first layer of circumferentially extending reinforcing fibers;

(e) thereafter externally coating said first layer of circumferentially extending reinforcing fibers with a second multidirectional reinforcing mat;

(f) thereafter externally coating said second multidirectional reinforcing mat with a second layer of longitudinal reinforcing fibers;

(g) thereafter externally coating said second layer of longitudinal reinforcing fibers with a third multidirectional reinforcing mat;

(h) thereafter externally coating said third multidirectional reinforcing mat with a second layer of circumferentially extending reinforcing fibers;

(i) binding all of said layers applied in steps (b)(h) by a curable plastic resin, and curing said resin;

said reinforcing fibers and mat being made of at least one material selected from the group consisting of glass fibers, carbon fibers and fibers of polymeric plastic material; and (j) after step (i), causing a liquid to fill said tube.

4. The method of claim 3, further including:

after conducting step (h), causing a hydraulic signal to be transmitted by said liquid.

\* \* \* \* \*